(12) United States Patent
    Glomset

(10) Patent No.: US 12,582,107 B2
(45) Date of Patent: Mar. 24, 2026

(54) PUMPS IN SERIAL CONNECTION

(71) Applicant: MMC First Process AS, Fosnavåg (NO)

(72) Inventor: Roy Steve Glomset, Skodje (NO)

(73) Assignee: MMC First Process AS, Fosnavåg (NO)

( * ) Notice: Subject to any disclaimer, the term of this patent is extended or adjusted under 35 U.S.C. 154(b) by 196 days.

(21) Appl. No.: 18/280,864

(22) PCT Filed: Mar. 9, 2022

(86) PCT No.: PCT/EP2022/056081
    § 371 (c)(1),
    (2) Date: Sep. 7, 2023

(87) PCT Pub. No.: WO2022/189529
    PCT Pub. Date: Sep. 15, 2022

(65) Prior Publication Data
    US 2024/0167468 A1      May 23, 2024

(30) Foreign Application Priority Data
    Mar. 10, 2021    (NO) .................................... 20210314

(51) Int. Cl.
    F04B 19/12        (2006.01)
    A01K 79/00        (2006.01)
                    (Continued)
(52) U.S. Cl.
    CPC .............. A01K 79/00 (2013.01); F04B 19/12 (2013.01); F04B 23/028 (2013.01); F04B 49/03 (2013.01);
                    (Continued)

(58) Field of Classification Search
    CPC ...... F04D 1/04; F04D 13/12–16; F04D 17/06; A01K 79/00; F04B 19/12;
                    (Continued)

(56) References Cited

U.S. PATENT DOCUMENTS

| | | | | | |
|---|---|---|---|---|---|
| 389,071 | A | * | 9/1888 | Glessner | .................. F04F 1/06 |
| | | | | | 417/137 |
| 1,005,664 | A | * | 10/1911 | Snyder | .................... B27L 5/025 |
| | | | | | 417/94 |

(Continued)

FOREIGN PATENT DOCUMENTS

| | | | | | |
|---|---|---|---|---|---|
| AT | 77818 | B | * | 8/1919 | |
| AU | 2018100994 | A4 | * | 8/2018 | ............ E02F 3/9275 |

(Continued)

OTHER PUBLICATIONS

Patent Cooperation Treaty, International Application No. PCT/EP2022/056081, "International Search Report," Jun. 23, 2022, 2 pages.

*Primary Examiner* — Alexander B Comley
(74) *Attorney, Agent, or Firm* — Bradley Arant Boult Cummings LLP

(57)        ABSTRACT

System for transporting a liquid from a reservoir containing the liquid. The system includes a first and second conduit, each with a lower end and an upper end, a first pump, with an inlet end and an outlet end; wherein one of the lower end of the first conduit or the upper end of the second conduit is connected to a second pump; wherein a height difference between the first and second pump is within a maximum pumping height of a lower pump of the first and second pump. Further, the present invention relates to a method for operating a plurality of pumps in a system.

29 Claims, 4 Drawing Sheets

(51) Int. Cl.
    *F04B 23/02*      (2006.01)
    *F04B 49/03*      (2006.01)
    *F04D 13/12*      (2006.01)

(52) U.S. Cl.
    CPC ...... *F04D 13/12* (2013.01); *F04B 2203/0209*
        (2013.01); *F04B 2205/01* (2013.01); *F04B*
        *2205/05* (2013.01)

(58) Field of Classification Search
    CPC ....... F04B 23/02–028; F04B 23/04–14; A22C
        25/08
    USPC ........ 99/360, 362; 415/71–73; 416/176–177;
        417/138
    See application file for complete search history.

(56)            References Cited

U.S. PATENT DOCUMENTS

| | | | | |
|---|---|---|---|---|
| 1,021,714 | A * | 3/1912 | Beltramo | B27L 5/025 |
| | | | | 417/94 |
| 1,114,603 | A * | 10/1914 | Giger | F04F 1/06 |
| | | | | 417/137 |
| 1,720,999 | A * | 7/1929 | Cawley | F04B 19/12 |
| | | | | 416/177 |
| 2,190,968 | A * | 2/1940 | Acree | F04B 19/12 |
| | | | | 417/61 |
| 2,191,424 | A * | 2/1940 | Cardinal | F04F 1/18 |
| | | | | 37/322 |
| 2,910,833 | A * | 11/1959 | Pancheri | E02B 8/08 |
| | | | | 137/142 |
| 3,038,314 | A * | 6/1962 | Hultman | A01K 61/00 |
| | | | | 137/625.46 |
| 3,038,760 | A * | 6/1962 | Crooke | A01K 79/00 |
| | | | | 405/83 |
| 3,489,074 | A * | 1/1970 | Farkas | A23B 2/001 |
| | | | | 99/360 |
| 3,586,510 | A * | 6/1971 | Farkas | A23L 5/11 |
| | | | | 99/452 |
| 3,875,058 | A * | 4/1975 | Nordgard | C02F 3/082 |
| | | | | 261/92 |
| 4,010,647 | A * | 3/1977 | Kissell | G01N 1/22 |
| | | | | 73/864.34 |
| 4,676,892 | A * | 6/1987 | Grabowski | C02F 3/082 |
| | | | | 261/92 |
| 4,830,865 | A * | 5/1989 | McFarlane | A23B 2/465 |
| | | | | 426/399 |
| 4,897,356 | A * | 1/1990 | Simpson | C02F 3/082 |
| | | | | 210/150 |
| 5,556,765 | A * | 9/1996 | Dedolph | B01J 19/0066 |
| | | | | 366/135 |
| 6,811,382 | B2 * | 11/2004 | Buchanan | E21B 43/128 |
| | | | | 415/199.1 |
| 7,784,397 | B2 * | 8/2010 | Vedsted | A23B 4/005 |
| | | | | 99/356 |
| 8,100,354 | B2 * | 1/2012 | Pall | H04L 65/103 |
| | | | | 241/73 |
| 10,364,830 | B2 * | 7/2019 | Ehrnberg | F03B 17/061 |
| 2008/0271610 | A1 * | 11/2008 | Vedsted | F28D 1/0213 |
| | | | | 99/352 |
| 2014/0356070 | A1 * | 12/2014 | Stromotich | E02B 8/085 |
| | | | | 405/83 |
| 2019/0085840 | A1 * | 3/2019 | Leonard | F04B 49/20 |
| 2021/0153482 | A1 * | 5/2021 | Arnason | A23B 4/062 |
| 2021/0153514 | A1 * | 5/2021 | Arnason | A22C 25/02 |
| 2022/0386632 | A1 * | 12/2022 | Arnason | A22C 25/02 |

FOREIGN PATENT DOCUMENTS

| | | | | | |
|---|---|---|---|---|---|
| CA | 3172873 | A1 * | 12/2022 | ............ | A22C 25/02 |
| DE | 442863 | C * | 4/1927 | | |
| DE | 10100534 | A1 * | 7/2002 | ............ | F04B 19/12 |
| DE | 10252945 | A1 * | 6/2003 | ............ | F04B 19/12 |
| DE | 10231008 | A1 * | 1/2004 | ............ | F03B 17/063 |
| DE | 10100534 | B4 * | 5/2004 | ............ | F04B 19/12 |
| DE | 602005005642 | T2 * | 6/2009 | ............ | A23B 2/803 |
| GB | 469771 | A * | 8/1937 | ............ | C13B 30/02 |
| GB | 1004864 | A * | 9/1965 | ............ | F04D 11/005 |
| GB | 1222193 | A * | 2/1971 | ............ | A23L 3/185 |
| GB | 1427723 | A * | 3/1976 | ............ | F04B 19/12 |
| GB | 2029514 | A * | 3/1980 | ............ | F04B 43/12 |
| GB | 1565121 | A * | 4/1980 | ............ | F04D 3/02 |
| GB | 2507723 | A * | 5/2014 | ............ | E02B 8/08 |
| JP | 2010174537 | A * | 8/2010 | | |
| KR | 100541626 | B1 * | 1/2006 | | |
| NO | 20093094 | A1 * | 4/2011 | ............ | A01K 79/00 |
| NO | 330892 | B1 * | 8/2011 | ............ | A01K 79/00 |
| NO | 20201424 | A1 * | 6/2022 | ............ | A01K 63/02 |
| NO | 20210425 | A1 * | 10/2022 | ............ | A23B 4/06 |
| WO | WO-2005085521 | A1 * | 9/2005 | ............ | A23B 2/803 |
| WO | WO-2010078627 | A1 * | 7/2010 | ............ | F04B 19/06 |
| WO | WO-2020012509 | A1 * | 1/2020 | ............ | A22C 25/08 |

* cited by examiner

PUMPS IN SERIAL CONNECTION

THE TECHNICAL FIELD OF THE INVENTION

The present invention relates to pumps in general, and suction pumps for great height differences in particular.

The present invention relates to a system for transporting a liquid from a reservoir containing the liquid, wherein the system comprises a first and second conduit, each with a lower end and an upper end a first pump, with an inlet end and an outlet end;

wherein one of the lower end of the first conduit or the upper end of the second conduit is connected to a second pump;

wherein a height difference between the first and second pump is within a maximum pumping height of a lower pump of the first and second pump.

The present invention further relates to a method for operating a plurality of pumps in the system, wherein the method comprises the steps of:

activating an uppermost pump activating a pump below, wherein the outlet end of the pump below is connected to the inlet end of the preceding pump by means of a conduit, and the pump below is activated when the pump above reaches a liquid level where the pump above is not able to pump, supplying gas to the inlet end of the pump below controlling the air or gas content of the pump below with input from the pressure sensors at the inlet end and outlet end of the pump below.

BACKGROUND OF THE INVENTION

Transporting liquids by pumping the liquid from one location to another, either horizontally and/or vertically are known. Pumping vertically, especially by suction, has certain limitation regarding the pumping height.

In general, pumping requiring high lifting heights is challenging, and at the same time ensure gentle handling are even more challenging. With an increasing demand for high volume production, and simultaneously ensuring the quality, production facilities, e.g. fish farms, increase in size. In order to occupy as little area space as possible, the facilities are built higher which again demand increased pump capacity pumping in heights.

There are more and more land-based aquaculture and fish farming. And land-based aquaculture and fish farming require larger and larger reservoirs in order to ensure fish health and good quality of the farmed fish. During handling but also growth of the fish, there is a need for moving the content of a reservoir to another reservoir, either a nearby reservoir or a reservoir a distance away. The fish or other particles to be transported, such as roe, smolt even vegetables or eggs or other substances either organic or nonorganic substances, must be gently handled in order to ensure a good quality of the substances. For fish, roe, shrimp and smolt, it is also the health welfare that has to be safeguarded.

In fish farming plants there is an extensive use of e.g. centrifugal pumps and vacuum pumps, which represents a rough handling of the fish, increasing e.g. the stress level of the fish. Today e.g. fish is threated on fish carriers/vessels or with vacuum pumps, being a rough handling on the fish with possibly negative consequences where the fish stops eating, harmful damages on the skin of the fish etc.

Transporting liquids between reservoirs and especially between large reservoirs with a high water-level is a challenge (as the water level goes down?). Already back in 1640 Galileo Galilei discovered that a suction pump could not lift water higher than 10.01 meters. It was however the student of Galileo, Torricelli that explained that, at sea level, the air in the atmosphere has a weight that equals the weight of a 10.01 meters column of water. When water is pumped to the height of 10.01 meters, the atmosphere is no longer pushing on the water column below the piston, but still pushes on the water outside, the water has reached it counterbalance with the weight of the atmosphere. Thus, on the suction side of the suction pump, the maximum theoretical pumping height of water at sea level is about 10.01 meters and the practical pumping height is about 5-7 meters dependent upon the size of the pump.

Pumps in the marked, e.g. piston pumps, used for lifting particles in liquid are known. Piston pumps comprises a piston, a cylinder, an inlet valve and an outlet valve. The fluid to be pumped is sucked through the inlet valve into the pump when the piston moves and a volume in the cylinder increases. When the piston moves the opposite way, the inlet valve is closed, and the fluid is pressed out of the cylinder through the outlet valve. When pumping fluid containing particles, particles will tend to clog the valves and the intake or outlet of the pump as these are continuously being opened and closed in the cycle of pumping. When pumping fragile particles, such particles can thus be harmed. The pump and parts of the pump will be affected, and the efficiency of the pump will be reduced. Parts, and especially fragile details such as seals and valve flaps will possibly be broken or deteriorated. When pumping liquids containing fragile particles such as fish, roe, shrimps, smolt, vegetables etc. will thus be harmed and the quality of the pumped medium will be reduced, and their health welfare will be extensively affected.

There is therefore a need to address the above-mentioned challenges/It is an aim of the invention to provide a pumping system which overcomes these challenges or problems described above, or at least provide a useful alternative.

DISCLOSURE OF THE STATE OF ART

There is known a Coil pump combining the principle of an Archimedes screw and closed tubes or conduits, where the pumping medium is transported through the closed tubes or conduits of the pump. The tube or conduit is helically wound about a more or less horizontal axis, like a coil. The horizontal axis also being the rotational axis of the pump, where the tube or conduit is rotating around the axis. The pumping medium, is in general a mix of a liquid and a particle or substance, such as fish, roe, shrimps, smolt, vegetables etc. The pump is utilizing suction by ensuring an air-intake at the inlet of the pump. The closed tubes or conduits of the pump are half filled with water, about 50% water and 50% air or gas while pumping. The pump ensures that the particle or substance is constantly kept in a liquid filled environment while pumping. Tests have demonstrated that fish pumped show little or no signs of stress or damage to the fish skin and that the pump ensures gentle handling of the fish and gentle handling of living fish during transport. The fish can therefore be pumped more often at sorting or moving fish between tanks and thus can the volumes in the tanks or cages be better utilized.

WO2010/078627 A1 describes a system and method for pumping a fluid vertically. The fluid, such as water, is pumped through a conduit with a substantially vertically portion and gas, such as air, is supplied at or near a bottom region of the vertical portion of the conduit in order to decrease the head of the pump in the system. The system utilizing the gas for the pump to operate more efficiently and allow it to lift water at greater distances. The system utilizes a centrifugal pump which draws water through the pump. Pumping liquids with high viscosity, a high pressure is needed to provide the required flow rate. High pressure and high speed are factors increasing the stress level of the fish and friction between the content to be pumped and walls of the conduits or channels through which it is pumped.

Another known pump solution for increasing the pumping height is to use pumps that create a jet into a transport pipe. Such a solution is shown in U.S. Pat. No. 3,038,760, where three pumps are coupled to the same transport pipe at different levels. Each of the pumps have an inlet coupled to the pipe and an outlet through nozzles into the pipe downstream, such as at a higher elevation, of the inlet. The nozzles will create a jet into the pipe that forces the water upwards in the pipe. By injecting jets at intervals along the pipe, the water will be forced upwards along the whole length of the pipe. In order to continuously force the water, and fish, upwards, the jets have to be quite powerful. Such powerful jets are not kind to the fish and may damage or at least stress the fish. If a pump fails, the fish will find itself trapped in the pipe and some of the fish will be constantly prayed with the jet coming from the working pumps. If the remaining pumps are not shut down immediately, the trapped fish may be severely damaged.

GB2507723 describes a passageway for upstream or downstream migration of fish. The passageway comprises a plurality of chambers set at different elevations and pipes connecting the chambers. Turbines acting as pumps creates a flow through the pipes to encourage the fish to swim against the flow. While this system is fine for ensuring migration of fish, it is inefficient for transporting farmed fish out of a pen or a tank. This operation has to be performed within an as short time span as possible, only allowing fish health to be the limiting factor.

GB1222193 describes helical coil pumps. A first helical pump is coupled to the inlet of a treatment chamber and a second helical pump is coupled to the outlet end of the treatment chamber. The two pumps are operating independent of one another and are arranged on the same level.

U.S. Pat. No. 4,830,865 also describes helical coil pumps. Although several pumps are described, none of these are coupled in series to lift water to a higher elevation.

GB1004864 describes screw conveyors coupled in series. This system is not capable of lifting live fish to a higher elevation.

Helical coil pumps are considered among the most suitable pumps for gently conveying live fish from one place to another. However, to be able to convey the fish, the pump coil must be partly filled with water only. The best operating conditions is when the coil contains between 70% to 30% air, preferably about 50% water and fish and at 50% air. If the coil is filled completely or almost completely with water and fish, the water will just flow back though the coil despite the rotation of the coil. Hence, the helical coil pump is not suitable for lifting water over any substantial height. If the hydrostatic pressure at the outlet side of the pump is to high, the water will flow back into the coil and push water and air out from the coil through the inlet. If the pressure at the inlet side is too high, this will push water and air out from the coil through the outlet. The air will flow upwards, and the coil will become completely filled with water.

Despite this, the present invention will attempt to provide an arrangement and a method by which a helical coil pump can be used to lift water and fish to a higher elevation, and also the possibility to couple a plurality of helical coil pumps in series to increase the lifting height.

Objects of the Present Invention

A main object of the present invention is to provide a pumping system for pumping at higher heights than the theoretical and practical limitation of pumping height for coil pumps.

Another object of the present invention is to provide a pumping system ensuring a gentle handling of the objects to be pumped.

Yet another object of the present invention is to provide a pumping system ensuring a continuous flow of liquids and particles through the system.

A further object of the present invention is to provide a pumping system overcoming the pipe friction and thus loss of lifting height at long distance pumping.

SUMMARY OF THE INVENTION

In the following throughout the specification, the following terms means:

The term "coil pump" used throughout this document is used to describe an type of pump having a helically wound conduit therein, which when rotated about a longitudinal axis, has the ability to transport liquids.

The term "pump medium" or "pumping medium" used throughout the document refers to the liquid or liquid containing particles or substances or flowable or pumpable masses, to be transported by means of the system.

The term "inlet end of the pump" used herein refers to where the medium to be pumped is entering helical conduit of the pump.

The term "outlet end of the pump" used herein refers to where the pumped medium leaves the helical conduit of the pump.

The term "liquid" used herein refers to the pump medium to be transported from a reservoir throughout the system, the liquid simply being a liquid or a liquid containing particles or substances.

The term "liquid level" used herein, refers to the height of the liquid within the reservoir, the height being measured from the bottom of the reservoir to the surface of the liquid.

The term "gas" used herein, includes air, oxygen and oxygen from an oxygen generator and ozone for cleaning.

The term "conduit" used herein, includes both stiff or flexible conduit, pipe, tube, channel or tunnel through which the pump medium or liquid is transported.

One or more of the objects and advantages are achieved by a solution as defined in the independent claims. Preferred embodiments are also defined in the dependent claims.

In a first aspect, the present invention, is thus related to a system for transporting a liquid from a reservoir containing the liquid, to a level above a liquid surface in the reservoir, wherein the system comprises:

an upper coil pump, with an inlet end and an outlet end;
  a lower coil pump (300) with an inlet end and an outlet end;
  wherein the inlet end of the upper coil pump is fluidly coupled to the outlet end of the lower coil pump;
  wherein the inlet end of the lower coil pump is fluidly coupled to an outlet from the reservoir;

wherein the upper coil pump is arranged at a higher level than the lower coil pump; and a control system coupled to a sensor, said sensor monitoring the liquid level in the reservoir, the control system being coupled to the coil pumps to control activation and deactivation of the coil pumps depending on the liquid level in the reservoir.

The system may comprise at least one further coil pump fluidly coupled between an uppermost coil pump and a lowermost coil pump.

The control system is preferably coupled to a gas inlet valve to operate the gas inlet valve to let gas into a lower coil pump to activate the lower coil pump when the liquid level in the reservoir reaches the level of the inlet end of the coil pump immediately above the lower coil pump.

The height difference between an upper coil pump is conveniently within a maximum pumping height of a coil pump immediately below the upper coil pump.

The height difference between the upper coil pump and the coil pump immediately below is conveniently at least 5 meters.

The height difference between the upper coil pump and the coil pump immediately below may be at least 7 meters.

The height difference between the upper coil pump and the coil pump immediately below may be at least 10 meters.

The inlet end or a lower edge of the inlet end of an uppermost pump is conveniently arranged at or above the maximum liquid level of the reservoir.

The gas inlet valve is conveniently arranged at an inlet end of the lower coil pump or in a conduit connected to the inlet of the lower coil pump.

The gas may be air, oxygen or oxygen from an oxygen generator together with ozone.

An outlet valve is preferably arranged at an outlet end of the coil pump, extracting the gas from the liquid within the coil pump.

The outlet valve is preferably operatively connected to the inlet valve for recycling of gas exiting from the outlet end of the coils pump.

A return conduit may be present to route back gas to the valves at the intake end of another coil pump in the system.

The control system preferably coupled to a speed regulator of the coil pumps.

The control system preferably coupled to pressure sensors at the inlet end of the coil pumps.

The control system may also be coupled to pressure sensors at the outlet end of the coil pumps.

In a second aspect, the present invention is thus related to a method for operating a plurality of coil pumps coupled in series and arranged at different levels, where the total lifting height of the series of coil pumps exceeds the lifting height of each pump, and the series of pumps is coupled to a liquid reservoir, wherein the method comprises the steps of:

activating an uppermost coil pump of the series of coil pumps when the level of liquid of the reservoir is at or above an inlet to the uppermost coil pump, activating a coil pump of the series of coil pumps immediately below the uppermost coil pump, when the liquid level of the reservoir is below the inlet of the uppermost coil pump, wherein the activation of the pumps involves supplying gas to the inlet end of the pump and that any pumps below the activated pump(s) are kept full of liquid.

The supply of gas preferably involves controlling the gas content of the pump with input from pressure sensors at the inlet end and outlet end of the pump.

The gas is conveniently supplied to the coil pump in a sufficient degree to keep the gas/liquid ratio inside the coil pump between 30% and 70%.

The gas/liquid ratio is preferably kept at about 50%.

The pumps that are not activated may be turned at an idle speed.

The pumps that are not activated may be kept stationary.

According to the invention a coil pump is activated when the pump has a ratio between gas and liquid that ensures that liquid is moved through the coils when the pump rotates. This ratio is between 30% and 70%, and ideally about 50%. A pump is deactivated when it is substantially filled with liquid. In that state the pump will act as a mere conduit. A deactivated pump may rotate. The rotation will not influence substantially on the transport of liquid through the pump.

By rotating the pump also when it is deactivated, a speed controller may not be necessary. The activation of the pump can be done merely by injecting gas into the pump until the rotation starts to move liquid along the coil of the pump.

The system comprises a system for transporting liquid. The liquid is typically transported from a reservoir containing the liquid. The reservoir may further contain particles in a mix with the liquid. The particles are typically biomasses, such as fish, smolt, roe, eggs, vegetables or other biomasses to be gently handled in order not to be exposed to any kind of injury or harm. Or the reservoir is filled with liquid and nonorganic masses to be handled with care. The system further comprises at least two pumps and a conduit, such as a duct or a pipe, the conduit making a connection between a reservoir to be emptied and the pumps. The inlet of the conduit being placed at the bottom of the reservoir or in a position ensuring a continuous contact with the pumping medium until the reservoir is emptied. The pumps being serial connected and placed at different heights. The uppermost pump being placed with its inlet at or above the height of the water level of the reservoir to be emptied, or preferably the lower edge of the inlet of the pump is at or just above the water level of the reservoir to be emptied. The at least one lower placed pump being placed somewhere between the uppermost pump and the bottom of the reservoir to be emptied. The height difference between the pumps in the system is the maximum practical pumping height of the preceding pump in the system. The maximum height between the lowermost pump in the system and the bottom of the reservoir is the maximum practical pumping height of that lowermost pump.

An embodiment of a coil pump is characterized by a pump comprising a rotor of a helically formed duct or pipe around an axis of rotation, the helically formed duct or pipe having at least two windings. The pump is having an inlet end for intake of the mass to be pumped and outlet end. The helically formed duct or pipe can rotate around the rotational axis independently from the inlet end and outlet end. The pump may alternatively have two helically formed ducts or pipes with a common inlet end and outlet end. The two helically formed ducts or pipes are preferably rotated in opposite rotational directions. The capacity of the coil pump is dependent upon the number of windings and the circumference of the duct or pipe. The coil pump provides a compact design and provides a flexibility in where to place. The coil pump, compared with vacuum pumps, centrifugal pumps etc., is more silent in operation, and thus is the fish less influenced by noise. A coil pump is also reversable, meaning that it can be reversed to pump in the opposite direction i.e. it can pump in both directions, without the need for rearranging the system or having two systems between two reservoirs to pump in opposite directions between two reservoirs. The pump can keep pumping approximately down to zero revolutions and it can start without necessarily emptying the pipes and ducts if the system is stopped due to malfunctions, planned stop, etc.

The system of the present invention comprises at least one coil pump and the uppermost pump may preferably be a coil pump, but alternatively another suitable pump for the purpose of the system is also possible.

The system comprises a valve for air or gas supply to the inlet of the pumps. The suctional function of the pump is ensured through supply of air or gas. Air is released from the pump at the outlet end of the pump, preferably by means of an outlet valve. The air may be released to the surroundings, recycled in the system or following the pumped medium further in the system and provide an extra lift to the pumping medium, as air or gas in water is known to have an elevating effect. The air or gas is either from a pressurized tank, pressurized atmospheric air from the environment or in a combination with a return line or conduit from the outlet valve at the outlet end of the pump or from an outlet valve at the outlet end of another pump in the system.

The system further comprises a control system and sensors such as temperature sensors and pressure sensors giving input to the control system. The control system regulating and monitoring the process in order to ensure a continuous and even flow through the pumps; start, stop, controlling the process, shut-down of system, pressure, rotational speed etc. The control system receives information from the different sensors and utilizes the information to e.g. regulate the valves, ensure sufficient supply of air or gas, or regulate the flow rate.

The pumps being numbered from the uppermost pump being pump 1, the following pumps below being pump 2, 3, . . . , n+1, the number of pumps are decided upon the height of the liquid level in the reservoir to be emptied. The height difference between the pumps being maximum the practical pumping height of the pumps. The pumps are fluidly connected by means of conduits or ducts, and the lower most pump is fluidly connected with the bottom of the reservoir to be emptied by means of a conduit or duct, or at least constantly in fluid connection with the content of the reservoir to be emptied at least until it is emptied.

An example of an operation of emptying a reservoir filled with a pumping medium, pump 1 starts pumping, the liquid level of the reservoir is at a maximum height or below a level of an inlet end of pump 1 or at a level between pump 1 and pump 2. Pump 2 starts pumping when liquid level reaches a level of an inlet end of pump 2 or a level below the level of the inlet end of pump 2, has been reached. Pump n+1 starts pumping when liquid reaches a level of an inlet end of pump n+1 or a level below the level of the inlet end of pump n+1, has been reached and empties the reservoir. The pumping medium is being brought through the conduit and the pumps of the system.

In order to regulate the liquid level within the coils of the pumping pump, air is supplied at the intake of the pump. The air is either following the pumping medium into a next reservoir, the surroundings, a pump further up in the system or being recycled in a loop back into the intake of the pump or to the intake of a pump upstream the system. Air following in the conduit downstream a pump, may give a booster effect on the flow of the pumping medium, giving an extra lift to the pumping medium.

At long distance pumping, where the pipe friction is high and thus lifting height is lost, e.g. pumping from an interim net cage close to land to a production facility e.g. 2 km away and a height different of about 4-5 meters, e.g. two pumps (or more) in series as described above can be utilized in order to overcome the loss in a long pumping leg.

BRIEF DESCRIPTION OF THE FIGURES

Embodiments of the present invention will now be described, by way of example only, with reference to the following figures, wherein.

PRINCIPLES OF THE INVENTION

Figure 1:
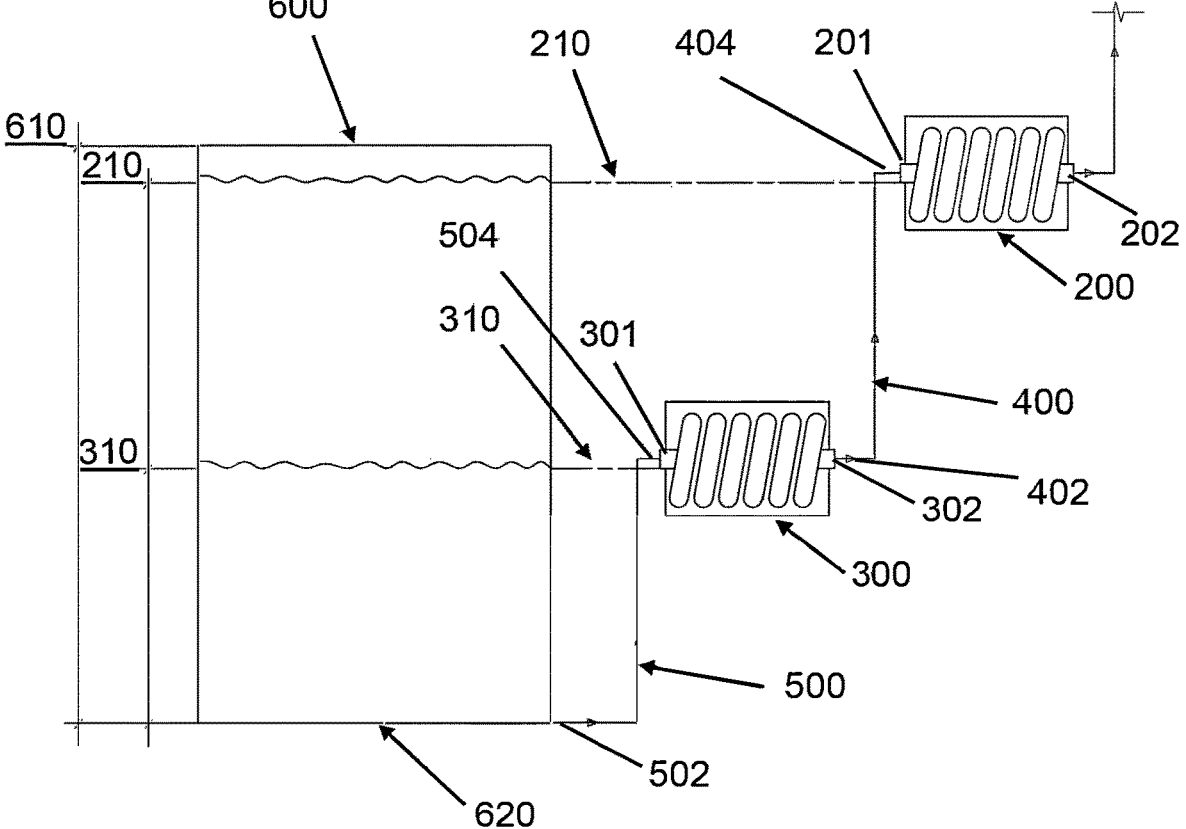
FIG. 1 shows schematically a view of the system of serial connected pumps.

The inventor has realized that by serial connecting suction pumps, wherein the pumps are located at different height levels, that by switching between two operating states the pumps can pump higher than the practical pumping height of a pump.

The number of pumps in the system is dependent on the total liquid level of the reservoir to be emptied. The number of pumps can be decided upon the liquid level of the reservoir to be emptied divided upon the practical pumping height of the pumps.

The two operating states are an active state and a passive state.

In the active state, the pump is operating, and a pump motor is ensuring rotation of the coils of the pump. Air or gas is supplied to the inlet end of the pump and a control system is ensuring a content of approximately 50% air or gas and 50% liquid within each coil of the pump.

The control system is receiving input from sensors monitoring the amount of air or gas in each pump. The sensors detect e.g. the pressure, flow rate, temperature etc. in the pump.

In the passive state, the pump is not in operation and no power needs to be supplied to the pump, although it may still be rotating. The coils are completely filled with liquid and a supply of air or gas is not needed. A pumping medium will however be able to pass the coils of the pump, even though the coils are not rotating. If, e.g. fish are part of the pump medium, the fish will not be affected of the coils of the pump, but follow unaffected through the pump, continuously in contact with water.

When an active upper pump has reached a liquid level at the inlet end of or at the lower edge of the inlet end of a pump below (lower pump), the pump below being in passive mode directly connected to the inlet end of that pump will be activated.

An uppermost pump will always be operating in active state when the system is operating. When the system is not in operation, all pumps will be in a passive state. When a pump sequence of the system is initiated, the first pump is activated. The inlet end of the uppermost pump being at a height equal to or above the liquid level of the reservoir. When the liquid level is at the inlet end of or at the lower edge of the inlet end of a pump below, the lower pump will be activated and switch from a passive state to an active state.

When a pump reaches a state where it is no longer able pump because the pressure at its inlet is too low, a pressure sensor at the inlet of that pump, at the outlet of a lower pump or in the conduit connecting the inlet end of the pump to the outlet of the lower pump, triggers a signal to warn about the low pressure and to initiate a start-up/activation of the lower pump being in a passive state. The signal can be a warning signal for an operator, or the signal can be sent to a control unit for automatic action of an appropriate response. The star-up/activation can be manually initiated by the operator or it can be automatically initiated by the control unit. The activation can also be initiated by measuring the water-level in the reservoir. The control unit receives information when the reservoir has reached a given water-level, e.g. at the inlet or at the lower edge of the pump below and initiates a start-up of the lower pump.

The control system will receive input from monitoring sensors in the system calculating the pressure at the inlet end or outlet end of each pump, the liquid level of the reservoir or the flow rate through the system. The control system will activate a further pump when it receives information that a higher pump of the system has reached a liquid level being at the inlet end of or at the lower edge of the inlet end of the pump below.

The lower pump is located at a level, preferably at or above the liquid level where the higher pump has reached a liquid level being at the inlet end of or at the lower edge of the inlet end of the pump below. The lower pump will be connected to a motor rotating the lower pump and gas will be supplied to the inlet end of the lower pump.

A further pump below will be activated and switch from the passive state to the active state when the lower pump reaches a liquid level being at the inlet end of or at the lower edge of the inlet end of the further pump below. If, however, the reservoir is emptied when it reaches this level or before that level, the control system is receiving information from the sensors of the system and will provide a secure shut down of the system.

DETAILED DESCRIPTION OF PREFERRED EMBODIMENTS OF THE INVENTION

FIG. 1 shows schematically a view of the system 100. The system 100 shows two pumps 200, 300, but the system is not restricted to only two pumps 200, 300, it may be more (as shown by the three pump system in FIG. 5), dependent upon the total height of a level of a content, the content being a liquid or a mix of liquid and substances, of a reservoir 600 to be emptied, the reservoir being e.g. a tank, compartment, cage, etc. The system comprises a first pump 200, the first pump 200 comprising an inlet end of the first pump 201 and an outlet end of the first pump 202 and a first conduit 400 with a lower end and an upper end, wherein the upper end of the first conduit 400 is connected to the inlet end of the first pump 200. The system further comprises at least one second pump 300, the second pump 300 comprising an inlet end of the second pump 301 and an outlet end of the second pump 302 and at least one second conduit 400. The outlet end of the second pump 302 is connected to the lower end of the first conduit 400 and the inlet end of the second pump 301 is connected to the upper end of the second conduit 500. The lower end of the second conduit 500 is connected to the bottom of the reservoir 620 or at least constantly in fluid connection with the content of the reservoir 600 to be emptied, at least until it is emptied.

In a system 100 with two pumps as shown in FIG. 1, the reservoir 600 has two liquid levels; a first liquid level 210 being the uppermost liquid level and a second liquid level 310 being the lowermost liquid level shown in the figure. The reservoir 600 is initially filled with a pump medium, the pump medium being a liquid or a mix of liquid and substances or flowable or pumpable masses. The reservoir 600 is, before the system 100 starts pumping, filled with the pump medium to or below a maximum height. The maximum height being a first liquid level 210. The first liquid level 210 being at the height of the total practical pumping height of the first pump 200 and the second pump 300. The second liquid level 310 is at a level below the first liquid level 210. The maximum height difference between the first liquid level 210 and the second liquid level 310 is maximum the practical pumping height of the first pump 200. The height of the second liquid level 310, from the bottom of the reservoir 620 is the maximum of the practical pumping height of the second pump 300.

The inlet end of the first pump 201 being arranged at or below the first liquid level 210. When the system 100 is in operation, the first pump 200 will be actuated and start pumping at the first liquid level 210. The pumping medium will be pumped from the reservoir 600 through the second conduit 500, passing the inlet end of the second pump 301, through the coils or windings of the second pump 301 passing the outlet end of the second pump 302, through the first conduit 400, through the inlet end of the first pump 201, through the coils or windings of the first pump 200 and leaves the first pump 200 through the outlet end of the first pump 202. The first pump 200 further comprises an air or gas supply inlet valve (not shown) to the inlet end of the first pump 201 ensuring air or gas supply to the first pump 200 while pumping. When a second liquid level 310 is reached the second pump 300 starts pumping. The second pump 300 further comprises an air or gas supply inlet valve (not shown) to the inlet end of the second pump 301 ensuring air or gas supply to the second pump 300 while pumping. The pumping process continuous until the reservoir 600 is empty.

FIG. 1 shows two pumps 200, 300 in the system 100, but the system 100 is not restricted to only two pumps 200, 300, it may comprise more than two pumps. The more than two pumps 200, 300 arranged height wise as the two pumps 200, 300 shown in the FIG. 1.

Figure 4:
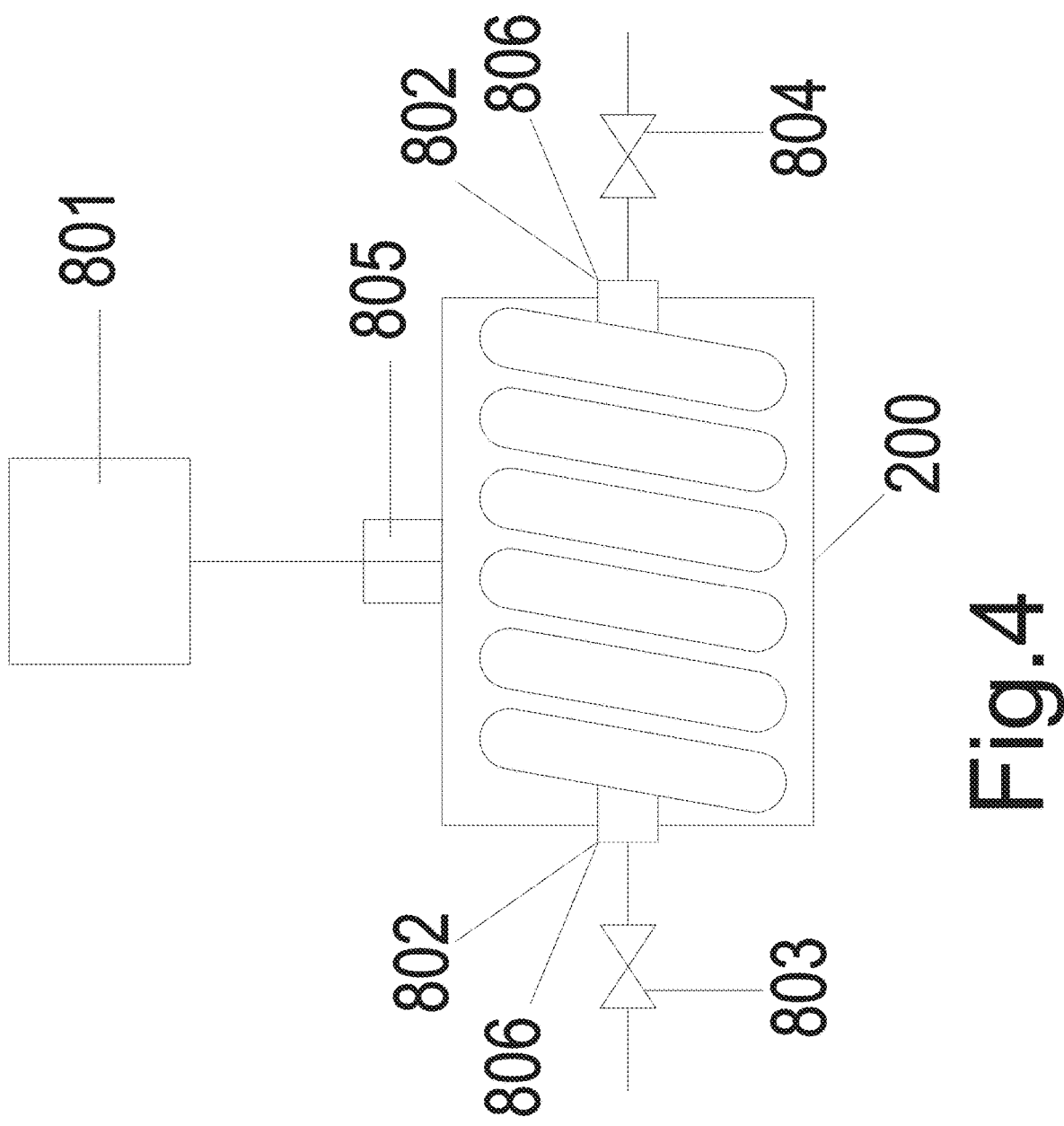
FIG. 4 shows schematically one of the coil pumps in the system with associated components.

FIG. 4 shows one coil pump 200 and associated equipment. It should be understood that this pump is representative of all pumps of the system. Sensors 802, 806 are typically arranged at the inlet end of the pumps 201, 301 and at the outlet end of the pumps 202, 302. The sensors may be flow and temperature sensors 802 and pressure sensors 806. A control system 801 regulates and monitoring the process in order to ensure a continuous flow and sufficient supply of air or gas through an air or gas supply inlet valve 803, and let air or gas out through an air or gas supply outlet valve 804. A speed control unit 805 may also be included.

Figure 2:
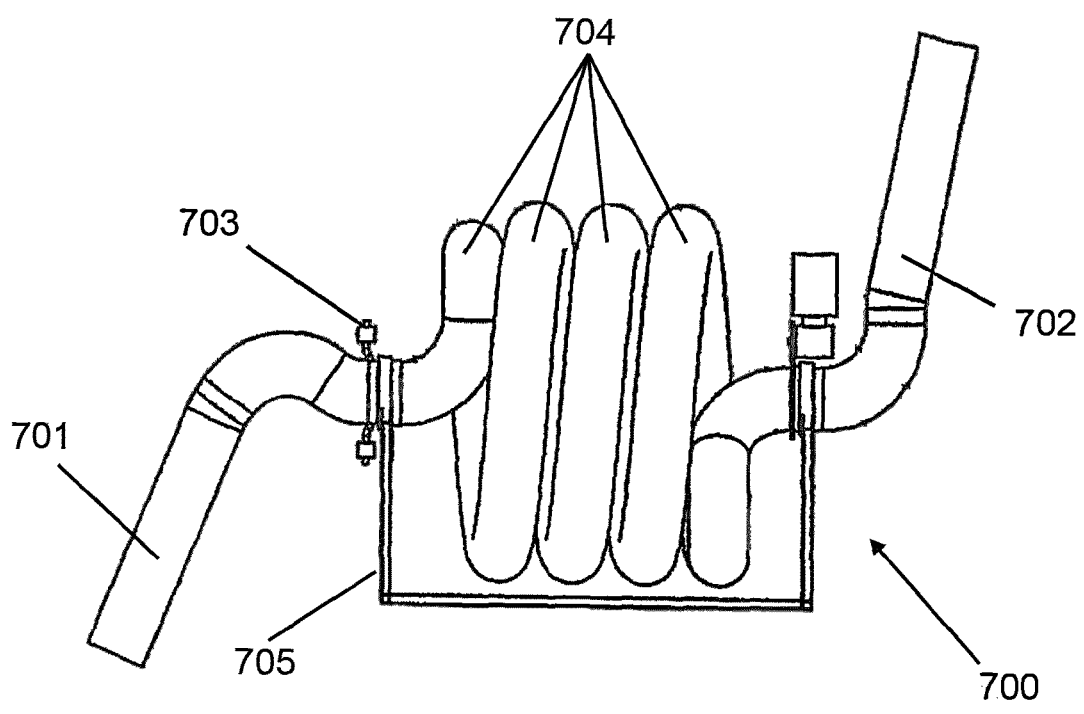
FIG. 2 shows schematically a view of a coil pump used in the system.

FIG. 2 shows schematically a view of a coil pump 700 used in the system 100. The coil pump 700 comprises a helically or coiled tube/conduit rotor of at least two coils or windings 704, wound around an axial axis. The figure shows four coils or windings 704, but it is not restricted to four coils or winding 704, it may have two or three coils or windings 704 and it may have more coils or windings 704. The coils or winding 704 comprises an axial inlet end (not shown) and an axial outlet end (not shown). Rotating couplings (not shown) are arranged at the axial inlet and outlet ends of the rotor, said rotating couplings are supported in a support frame 705. The rotor comprising the coils or windings 704 and axial inlet and outlet ends are rotatably around the axial axis. The rotor is driven by a motor, wherein a driving being a drive belt, drive chain or a drive shaft with a gear.

The coil pump 700 further comprises an inlet end of coil pump 701 and an outlet end of coil pump 702, corresponding to the inlet end of the first and/or second pump 201, 301 and outlet end of first and/or second pump 202, 302. The inlet end of coil pump 701 and the outlet end of coil pump 702 are connected to conduits 400, 500.

Figure 3:
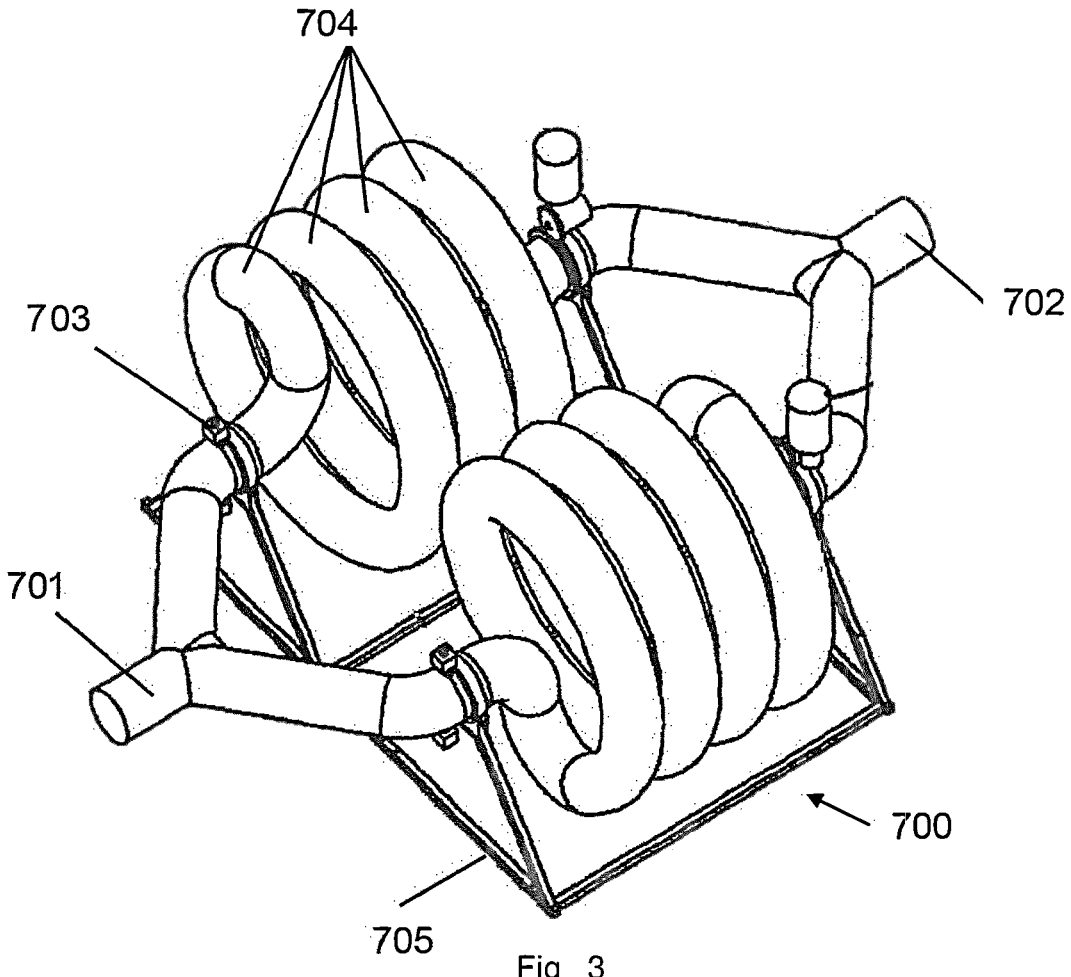
FIG. 3 shows schematically a view of a coil pump used in the system, the coil pump having two parallel coils with a common inlet and outlet end.

FIG. 3 shows schematically a view of a coil pump 700 as described in FIG. 2, the coil pump 700 of FIG. 3 having two parallel coils or windings 704, wound in opposite direction. The coil pump 700 has a common inlet end of coil pump 701 and outlet end of coil pump 702. The parallel coils or winding 704 forming the rotor are rotatable in opposite direction and each coil or winding 704 are driven by two separate motors.

It is described and shown a system 100 for transporting liquids or liquids in a mix with particles in a vertical direction, but it is not restricted to such use. The system may also be utilized for transporting in horizontal direction or a combination of vertical and horizontal direction. The pumps of the system 100 being arranged in a serial connection between conduits, where one end of one of the conduits is connected to a reservoir 600.

Figure 5:
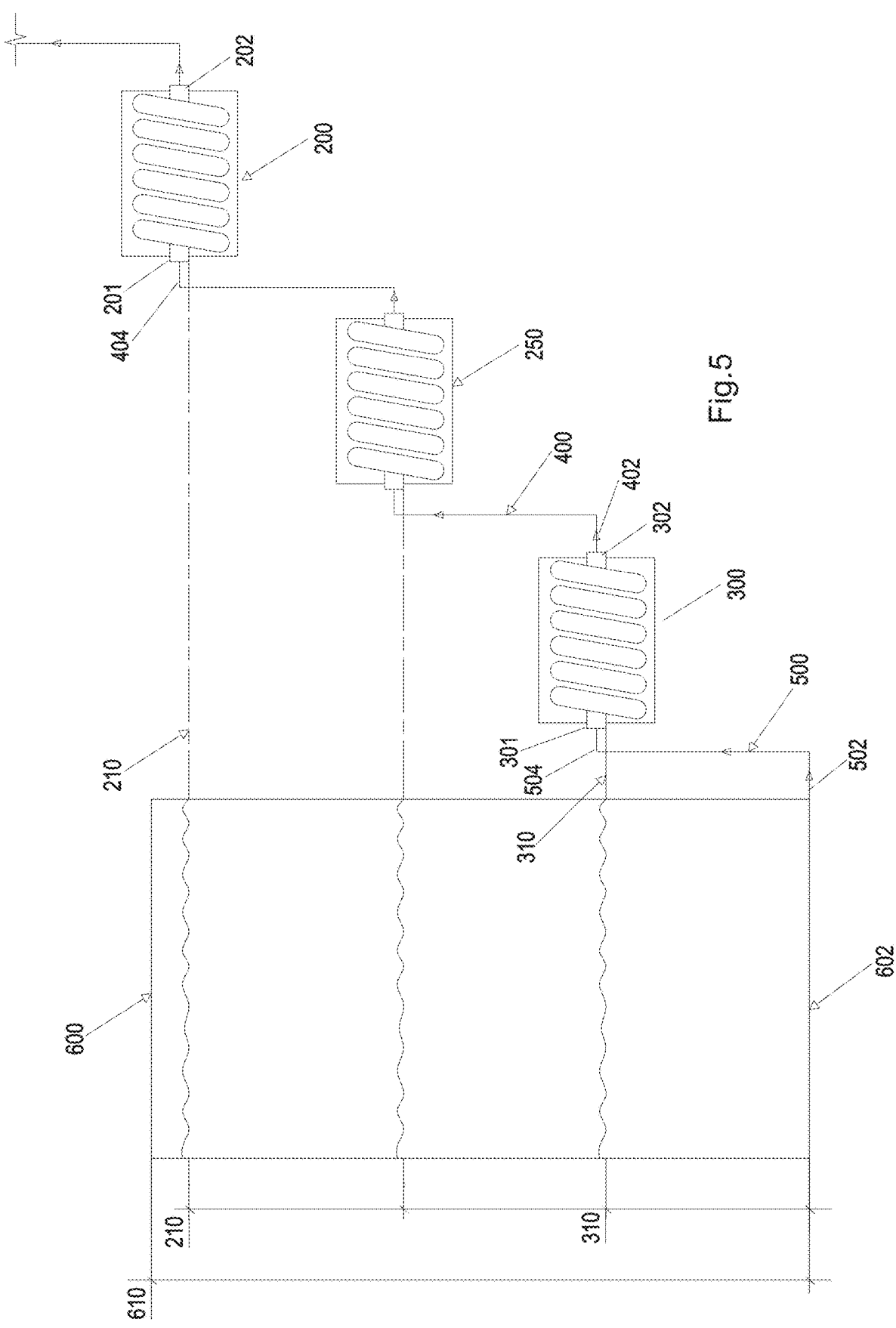
FIG. 5 shows an embodiment of the system of the invention with three coil pumps in series.

FIG. 5 shows a system according to the invention with an additional coil pump as an intermediate coil pump 250 added between the lower coil pump 300 and the upper coil pump 200. It should be understood that there may be more than one intermediate coil pump.

The intermediate coil pump 240 has its inlet coupled to the outlet of the lower coil pump and its outlet coupled to the inlet of the upper coil pump 200.

TABLE 1

| Component | Description |
|---|---|
| 100 | System |
| 200 | First pump |
| 201 | Inlet end of first pump |
| 202 | Outlet end of first pump |
| 210 | First liquid level |
| 300 | Second pump |
| 301 | Inlet end of second pump |
| 302 | Outlet end of second pump |
| 310 | Second liquid level |
| 400 | First conduit |
| 402 | Lower end of first conduit |
| 404 | Upper end of first conduit |
| 500 | Second conduit |
| 502 | Lower end of second conduit |
| 504 | Upper end of second conduit |
| 600 | Reservoir |
| 610 | Height of reservoir |
| 620 | Bottom of reservoir |
| 700 | Coil pump |
| 701 | Inlet end of coil pump |
| 702 | Outlet end of coil pump |
| 703 | Air or gas supply inlet valve |
| 704 | Coil or winding |
| 705 | Supporting frame |

The invention claimed is:

1. A system for transporting a liquid from a reservoir containing the liquid to a level above a liquid surface in the reservoir, the system comprising:

an upper coil pump with an inlet end and an outlet end;

a lower coil pump with an inlet end and an outlet end;

wherein the inlet end of the upper coil pump is fluidly coupled to the outlet end of the lower coil pump;

wherein the inlet end of the lower coil pump is fluidly coupled to an outlet from the reservoir;

wherein the upper coil pump is arranged at a higher level than the lower coil pump;

wherein the upper coil pump and the lower coil pump rotate independently of each other; and a control system coupled to a sensor, the sensor monitoring a level of the liquid surface in the reservoir, the control system being coupled to the coil pumps to control activation and deactivation of the coil pumps depending on the liquid level in the reservoir.

2. The system of claim 1, comprising at least one further coil pump fluidly coupled in series with the upper coil pump and the lower coil pump.

3. The system of claim 2, wherein the control system is coupled to a gas inlet valve to operate the gas inlet valve to let gas into the lower coil pump to activate the lower coil pump when the liquid level in the reservoir reaches a level of an inlet end of the at least one further coil pump, and to let gas into the at least one further coil pump.

4. The system of claim 3, wherein the control system is coupled to activate the at least one further coil pump when the liquid level in the reservoir reaches a level of the inlet end of the upper coil pump.

5. The system of claim 2, wherein a height between the upper coil pump and the at least one further coil pump is within a maximum pumping height of the at least one further coil pump.

6. The method of claim 5, wherein the lower coil pump is kept full of liquid as long as the level of the liquid surface in the reservoir is above the inlet end of the upper coil pump or an inlet end of the at least one further coil pump.

7. The system of claim 2, wherein a height between the upper coil pump and the at least one further coil pump is within a maximum pumping height of the at least one further coil pump, when the at least one further coil pump is immediately below the upper coil pump.

8. The system of claim 2, wherein a height between the at least one further coil pump and the lower coil pump is within a maximum pumping height of the lower coil pump, when the lower coil pump is immediately below the at least one further coil pump.

9. The system of claim 1, wherein the control system is coupled to a gas inlet valve to operate the gas inlet valve to let gas into the lower coil pump to activate the lower coil pump when the liquid level in the reservoir reaches a level of the inlet end of the upper coil pump.

10. The system according to claim 9, wherein the gas inlet valve is arranged at the inlet end of the lower coil pump or in a conduit connected to the inlet end of the lower coil pump.

11. The system according to claim 9, wherein the gas is air, oxygen, or oxygen from an oxygen generator together with ozone.

12. The system according to claim 9, wherein a first outlet valve is arranged at the outlet end of the lower coil pump and a second outlet valve is arranged at the outlet end of the upper coil pump, said first and second outlet valves being capable of releasing gas from the liquid within the lower and upper coil pumps.

13. The system according to claim 12, wherein the first or second outlet valve is operatively connected to the gas inlet valve for recycling of gas exiting from the outlet end of the lower coil pump.

14. The system according to claim 9, wherein a first outlet valve is arranged at the outlet end of the lower coil pump and a second outlet valve is arranged at the outlet end of the upper coil pump, said first and second outlet valves being capable of releasing gas from the liquid within the lower and upper coil pumps.

15. The system of claim 1, wherein a height between the upper coil pump and the lower coil pump is within a maximum pumping height of the lower coil pump, when the lower coil pump is immediately below the upper coil pump.

16. The system of claim 15, wherein the height between the upper coil pump and the lower coil pump is at least 5 meters.

17. The system of claim 16, wherein the height between the upper coil pump and the lower coil pump is at least 7 meters.

18. The system of claim 17, wherein the height between the upper coil pump and the lower coil pump is at least 10 meters.

19. The system according to claim 1, wherein the inlet end or a lower edge of the inlet end of the upper pump is arranged at or above the level of the liquid surface of the reservoir when the level is at a chosen maximum.

20. The system according to claim 1, wherein the control system is coupled to a speed regulator of the coil pumps.

21. The system according to claim 1, wherein the control system is coupled to a respective pressure sensor monitoring the pressure at the inlet end of a respective one of the coil pumps.

22. The system according to claim 1, wherein the control system is coupled to a respective pressure sensor monitoring the pressure at the outlet end of a respective one of the coil pumps.

23. A method for operating a plurality of coil pumps coupled in series, the series comprising at least a lower coil pump and an upper coil pump arranged at different levels, where the total lifting height of the series of coil pumps exceeds the lifting height of each coil pump, and the series of coil pumps is coupled to a liquid reservoir, the method comprising:

activating the upper coil pump of the series of coil pumps when a level of liquid of the reservoir is at or above an inlet end to the upper coil pump;

activating the lower coil pump of the series of coil pumps, when the liquid level of the reservoir is below the inlet end of the upper coil pump; and wherein the activation of the pumps involves supplying gas to an inlet end of the lower coil pump.

24. The method of claim 23, wherein supplying gas involves controlling a gas content of the activated coil pumps with input from a respective pressure sensor arranged at respective one of the inlet end and an outlet end of each of the coil pumps.

25. The method of claim 23, wherein the gas is supplied to at least one of the lower coil pump and the upper coil pump in a sufficient degree to keep a gas/liquid ratio inside the at least one of the lower coil pump and the upper coil pump between 30% and 70% when the at least one of the lower coil pump and the upper coil pump is activated.

26. The method of claim 25, wherein the gas/liquid ratio is kept at about 50%.

27. The method of claim 23, wherein at least one of the lower coil pump and the upper coil pump is turned at an idle speed when it is not activated.

28. The method of claim 23, wherein at least one of the lower coil pump and the upper coil pump is kept stationary when it is not activated.

29. The method of claim 23, wherein the series of coil pumps comprises at least one further coil pump arranged between the upper coil pump and the lower coil pump.

* * * * *